United States Patent [19]

George et al.

[11] Patent Number: 5,453,844

[45] Date of Patent: Sep. 26, 1995

[54] IMAGE DATA CODING AND COMPRESSION SYSTEM UTILIZING CONTROLLED BLURRING

[75] Inventors: Nicholas George, Pittsford; Bryan J. Stossel, Rochester, both of N.Y.

[73] Assignee: The University of Rochester, Rochester, N.Y.

[21] Appl. No.: 154,311

[22] Filed: Nov. 17, 1993

Related U.S. Application Data

[63] Continuation-in-part of Ser. No. 95,328, Jul. 21, 1993.

[51] Int. Cl.[6] ........................................... H04N 1/41
[52] U.S. Cl. ............................ 358/426; 358/432; 382/280
[58] Field of Search ................................. 358/426, 432, 358/433, 430, 428; 382/56; 380/18, 46, 44, 43

[56] References Cited

U.S. PATENT DOCUMENTS

4,873,577  10/1989  Chamzas ...................... 358/426
5,255,105  10/1993  Ireton et al. ..................... 358/426

Primary Examiner—Scott A. Rogers
Attorney, Agent, or Firm—M. Lukacher

[57] ABSTRACT

Data representing the image of an original picture having high resolution are first acquired. The data are then processed in accordance with a blurring function, which can be a randomly distributed point spread function. Processing can be carried out either in object space or in spatial-frequency space. In object space a multi-dimensional convolution is required. In the spatial frequency domain, processing is performed by a pointwise product of data representing the Fourier transform of the original image and the Fourier transform of the blurring function. The resulting blurred image is thereby coded such that the original scene is no longer discernible, but can be recovered provided the blurring function is known. Additionally, this blurred image can be shown to contain the detail of the original but can be stored or transmitted as data which are compressed by compression ratios which can range from 2 to 100. The compressed data can be restored to provide an image with detail like the original by inverse filtering using data representing the Fourier transform of the blurring function.

31 Claims, 4 Drawing Sheets

IMAGE DATA CODING AND COMPRESSION SYSTEM UTILIZING CONTROLLED BLURRING

DESCRIPTION

The U.S. Government has rights in this invention pursuant to contract DAAL-03-92-G-0147 between the Department of the Army and the University of Rochester.

This application is a continuation-in-part of our application Ser. No. 08/095,328 filed Jul. 21, 1993.

The present invention relates to image data coding and compression systems wherein the data representing an original image or picture can be transmitted or stored as a coded and compressed representation which renders the original scene unrecognizable and also requires far fewer pixels and/or bits than the original uncoded image.

The invention is especially suitable for use in compressing pictorial images into a representation having a compression ratio which can be selected to range from about 2 to 100. Compression may be achieved through either of two means: (1) by subsampling the data thereby reducing the number of pixels in the compressed representation, or (2) reducing the quantity of data used to represent the image by reducing the average number of bits-per-pixel in the representing data. The compression ratio is defined as the ratio of the number of pixels in the original to the number of pixels in the representing compressed data for the case of subsampled data or the ratio of the original quantity of data to the quantity of data needed in the compressed representation for the case of a bit reduction system. The compressed data represent a coding and compression of the original image in accordance with a selected random code, which unless the code is known, is not recoverable; this coded form being particularly advantageous for storage, transmission, and privacy.

This invention is especially useful for coding a picture prior to transmission or storage. For example the picture is greatly blurred, physically it takes on the appearance of a photograph recorded through turbulence. The controlled blurring greatly reduces the visual perception of edges and high frequency content is no longer discernible thereby rendering the original image unrecognizable. One may wish to code the picture for privacy reasons alone and this application is not dependent on also using the image compression aspects of this invention.

The present invention is based on the discovery that controlled blurring of an image provides information which contains all of the detail of the original and yet allows fast, accurate recovery of the original. One can show that the blurring causes a radical restructuring of the data in the spatial transform domain, greatly increasing amplitudes at low frequencies relative to high frequencies. In the case of a subsampling system, the number of pixels required to store or transmit the blurred image is then much smaller than for the original image. For the bit reduction system, the reduction in high frequency energy increases the compression ratio due to the reduction in bits required to code the high frequency information. In other words, the blurred image can be stored or transmitted as a compressed representation of the original image, without sacrificing the detail of the original image even though the blurred image appears degraded to an extent that the original is not recognizable from the blurred version. The amount of blurring and compression depends upon the blurring function. The blurring function is statistically a distribution characterized by a probability density function. Hence an infinite array of specific realizations can be generated for coding or blurring. One can generate a specific realization using a pseudo-random process generator. A particularly desirable function is a randomly distributed set of impulses yielding in transform space a speckle pattern or in general a random-walk transfer function. The function can have a uniform distribution or an exponential distribution or it can be generated using a fractal formula. The distribution may be Gaussian. It can be shown that the compression ratios can theoretically exceed 100. Compression ratios from 2 to 100 have been obtained in typical cases of interest.

Another desirable function for blurring is an impulse response consisting of the sum of two terms: an impulse at the origin and a Gaussian spot which is broad enough to span several pixels. For even more secure coding a final illustrative example is a point-spread-function having the following terms: a delta-function or impulse at the origin and a set of randomly arrayed Gaussian spots.

Compression and coding of image data has involved techniques operative on the data itself such as transformation coding using various types of Fourier transforms such as the discrete-cosine-transform (DCT). See M. Rabbani and S. Daly, Proc. Soc. Photo-Opt. Instru. Eng., 1071, 246–256 (1989) and U.S. Pat. No. 4,703,349 issued Oct. 27, 1987 to J. G. Bernstein. Other techniques have involved filtering of signals obtained from the image thereby reducing the frequency content and thereafter restoring the frequency content to retrieve the image. See, U.S. Pat. No. 4,777,620 issued Oct. 11, 1988 to Schimoni, et al. The literature relating to image reconstruction does not discuss blurring using the multiple impulse point spread function nor the random-walk transfer function and subsequent partial image reconstruction. See chapter entitled "Image Enhancement and Restoration" by B. R. Frieden in the treatise, Picture Processing and Digital Filtering, ed. by T. S. Huang, Springer-Verlag, Berlin 1979, and particularly Table 5.1 thereof. It has also been proposed to send a pilot signal subject to the same encoding transformations as the image representing signal through the encoding process. The pilot signal is separately detected and used to compensate for losses in picture information which are incidental to the encoding process. See U.S. Pat. No. 4,807,029 issued Feb. 21, 1989 to Tenaka. None of the processes discussed in the above-referenced patents nor any other processes for encoding have involved blurring of the image or using the blurred image to provide compressed data. It has not heretofore been appreciated that the blurred image contains all the detail of the original and that the blurring function provides the key or code by means of which the original can be restored from the blurred version without significant loss of detail or resolution.

It may be appreciated that an image formed by superimposed exposures on a photosensitive receptor of the original at different displacements results in a blurred image on the photosensitive receptor. Observation of this image makes it apparent that the detail, represented by high frequency content of the original, is not visually perceived in the blurred picture. In frequency space the high frequency information is attenuated and the area containing non-negligible information represented by the blurred picture is smaller than the corresponding area for the original image. Accordingly, the original image can be represented by compressed data. The distribution of the displacements is preferably a random distribution. The locations in which the multiple exposures are made as well as the number of exposures controls the blurring. Knowledge of the displacements (the blurring code) may be used in an inverse process to recover the original image. The process of blurring and recovery is preferably carried out with the aid of a digital computer or computers. Compressed data representing the blurred image may be transmitted or stored thereby reducing the time for transmission or memory space for storage over what would be required for transmission or storage of the original.

Accordingly, it is the principal object of this invention to provide an improved system for coding and compressing an image and particularly data representing that image whereby high compression ratios can be obtained and the original image accurately recovered from the compressed representation thereof.

It is a further object of the present invention to provide an improved system whereby data may be encoded into a compressed form so as to provide compression ratios which can be selected in accordance with the encoding function.

It is a still further object of the present invention to provide an improved system for data compression of image representing data using blurred versions of the image thereby maintaining fidelity of the image while requiring fewer pixels than in the original image, and enabling restoration or decoding only if the code for blurring is known.

It is a still further object of the present invention to provide an improved system for data encoding and possible compression of image representing data which utilizes controlled blurring in accordance with a blurring code which renders the original scene unrecognizable in the encoded image, can be decoded only with knowledge of the blurring function, and can readily be changed from time to time so as to suit different security requirements.

Briefly described, a system for representing an original image by compressed data from which a restored version of the original can be produced with approximately the same detail as the original comprises means for spatially coding the original to provide a blurred image. Means are then provided for spatially decoding the blurred image in accordance with the blurring code to provide the restored version of the original image with like resolution and detail.

The foregoing and other objects of the invention, as well as personally preferred embodiments thereof, will become more apparent from a reading of the following description in connection with the accompanying drawings in which:

Figure 1:
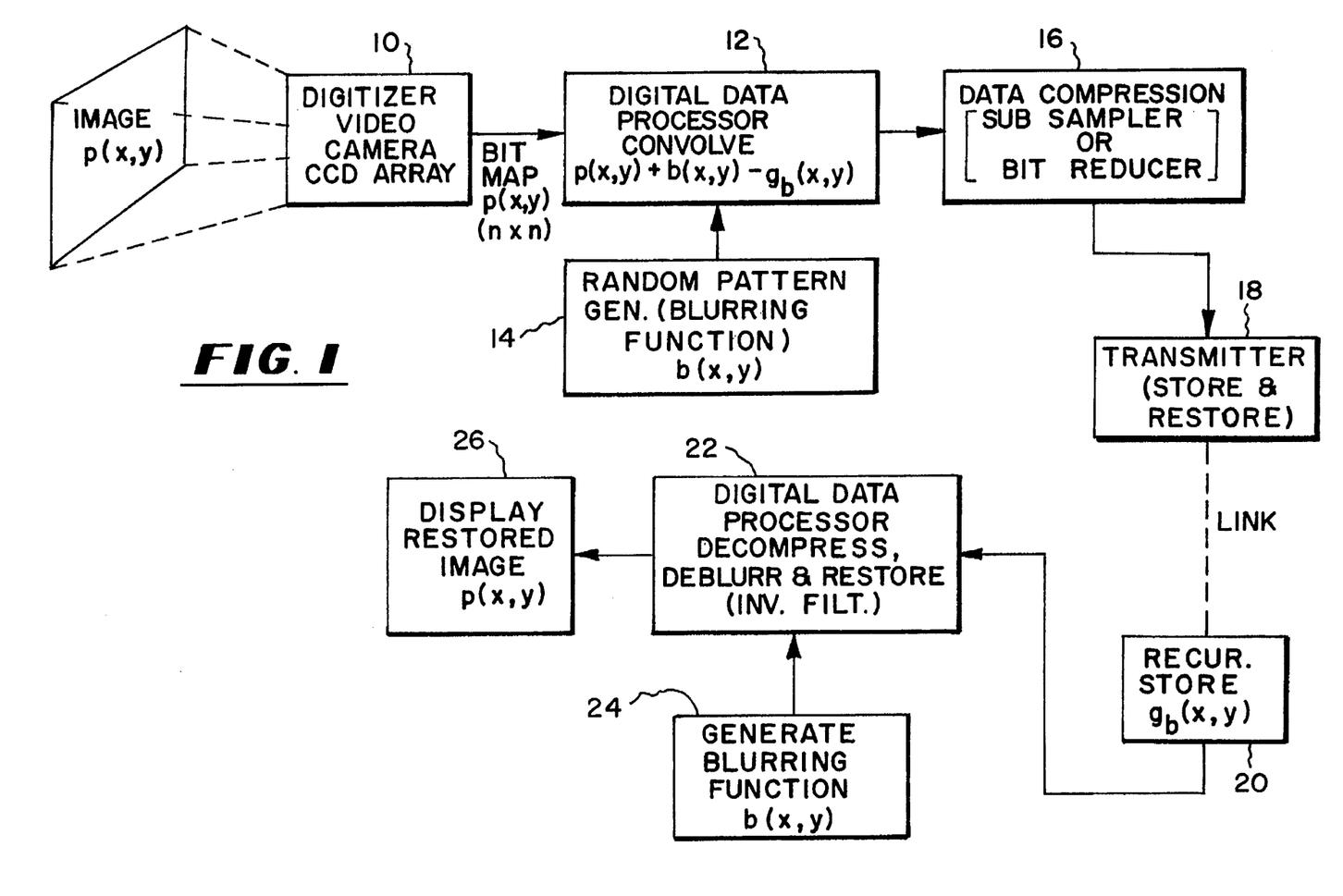
FIG. 1 is a block diagram illustrating a system for data compression and restoration utilizing a blurring function to process a pictorial image with a controlled blur, compressing the blurred picture by means of either subsampling or scanning the blurred image or utilizing less bits to represent the blurred data, transmitting or storing of the compressed data, and decompressing and deblurring to restore the original image.

Referring to FIG. 1, an original pictorial image denoted functionally by p(x,y) in x and y orthogonal coordinates, is acquired by image acquisition using a digitizer 10. The digitizer may have a video camera which may be a CCD array which provides a bit map of n×n pixels representing the image. This map is stored in memory in a digital processor 12 (a computer). The blurring function b(x,y) is inputted to the computer from a random pattern generator 14. The computer 12 itself may be programmed to generate the pattern. The pattern is two-dimensional and is, in a preferred form of the invention, a set of N impulses at positions $(x_n, y_n)$ chosen from a random process having a probability density function $f(x_n) f(y_n)$. These points may be from a uniform density function, Gaussian function (in general, an exponential function), or any of a wide variety of probability functions known to those versed in statistics. These functions represent random codes. Typical codes for different compression ratios are shown in Table I which is presented and discussed below. In effect, these random patterns produce, in transform space, speckle patterns which constitute a random-walk type of transfer function. The number of points, N, as well as the distribution of the N points determines the compression ratio. The distribution may be selected depending upon the desired compression ratio using 25–250 points. A compression ratio of pixels in the original image to pixels in the blurred image (the compressed data) can range from 2 to 100. These compression ratios can be obtained with 25 points spread over a 64×64 pixel array. For the case of a subsampling system, the compression ratio obtained then is determined by the sampling density at which the blurred picture is sampled in a sampler type data compressor 16a, in FIG. 3.

The processor 12 is programmed to convolve the original image data p(x,y) with the blurring function, b(x,y) to produce data representing the blurred image, $g_b(x,y)$. It can be shown, and is shown hereinafter, that the blurred picture requires less volume in frequency space to represent adequately the image than the unblurred picture and can be represented by compressed data. The blurred picture is in the form of a bit map which may be compressed using any standard bit reducing algorithm or it may be sampled by the sampler so as to provide compressed data. For the latter, the number of pixels is equal to n×n divided by the compression ratio, n being the number of pixels along each dimension of the original.

The compressor 16 in the case of a subsampling system may be a coarse resolution facsimile machine of the type which is commercially available. Then the image which is scanned is a pictorial image which may be formed on a screen or xerographically as hard copy. A bit map in storage in the computer 12 may also be sampled coarsely to provide the compressed data. Alternatively for the case of a bit reduction system, the compressor, as shown at 16a, FIG. 4, may use other compression methods operative on digital data representing the blurred image, $g_b(x,y)$. Such techniques include the DCT discussed in the Rabbani, et al. article referenced above and predictor methods such as differential pulse code modulation (DPCM). In either case the compressed data is applied to a transmitter 18 for transmission over a link, such as a radio or telephone channel. Alternatively the data may be stored and forwarded on the link. The compressed data may also be stored either optically or electronically on various recording media (e.g., magnetic tape or discs), and later recovered.

In the case of transmitted, compressed data, a receiver 20 acquires the transmitted data and stores it as the blurred picture data $g_b(x,y)$. A digital data processor 22 decompresses and deblurs the data utilizing a blurring function generator 24, which may be part of the processor 22. Since the blurring function b(x,y) is known, deconvolution or inverse filtering obtains the restored image, p(x,y) which can be displayed on a graphics display 26.

In the case of a subsampling system, the compressor 16 reduces the number of pixels to be transmitted or stored. This sampler as shown at 16a in FIG. 3, utilizes a display of the blurred image $g_b(x,y)$, which may be a video display or a photographic or xerographic copy of the blurred image. The display is indicated generally at 28 in FIG. 3. The display is scanned by a coarse scanner 30, such as a low cost fax machine, which provides the compressed data to a modem 32 (modulator which may have a demodulating function) which transmits the data over the link.

Figure 2:
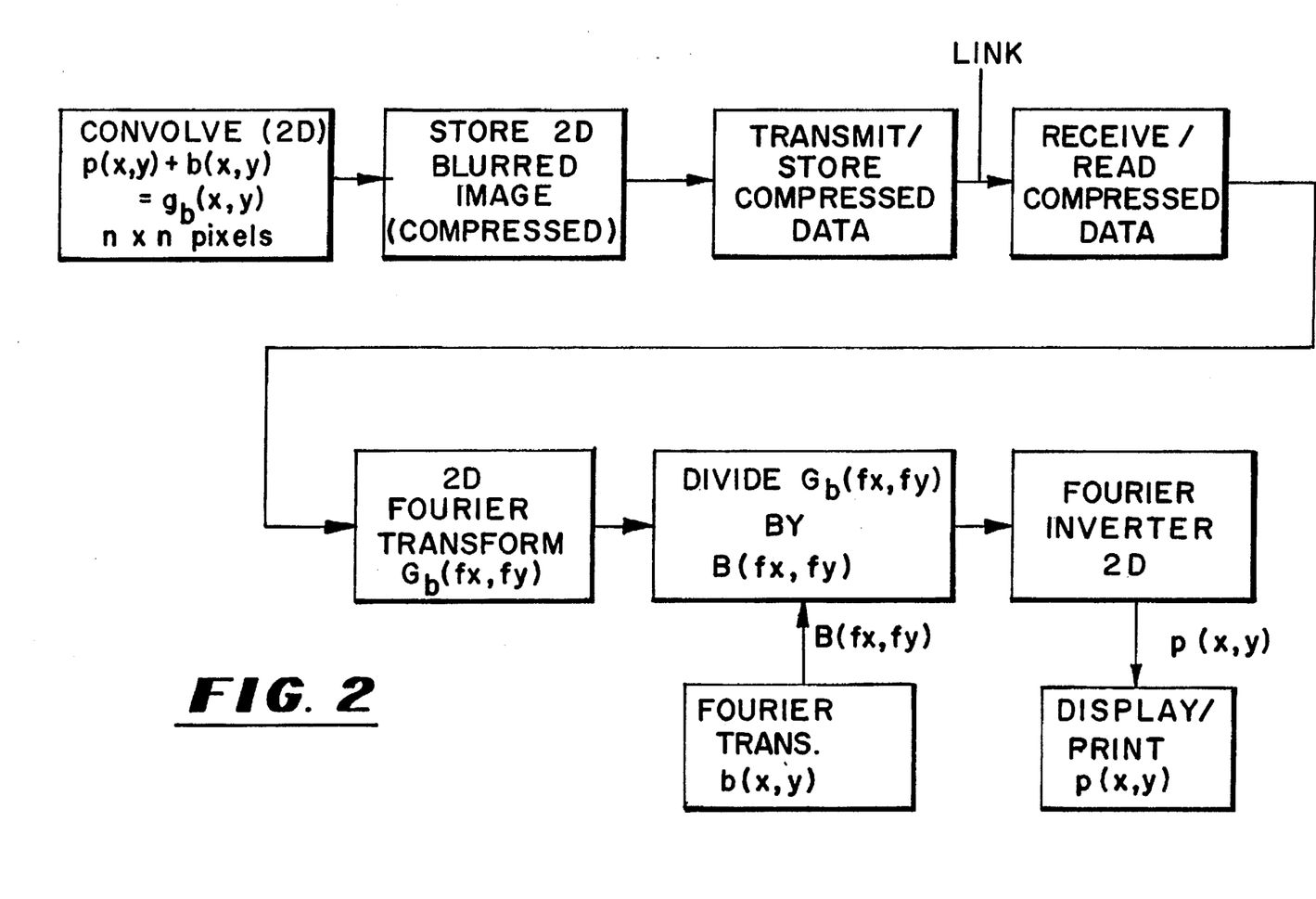
FIG. 2 is a block diagram or flow chart illustrating the data handling processes performed by the components of the system shown in FIG. 1.
Figure 3:
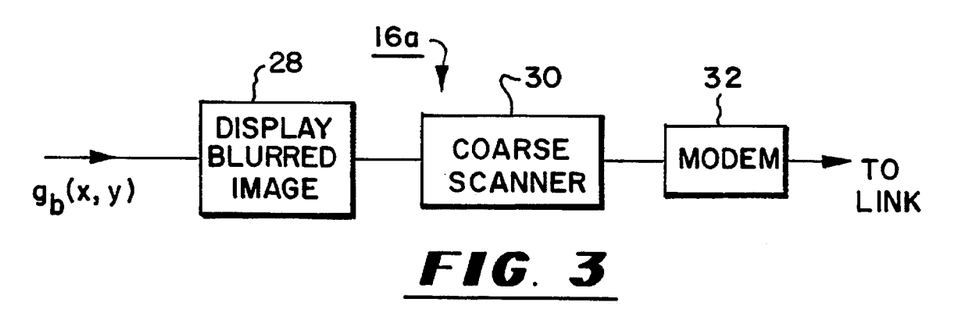
FIG. 3 is a block diagram illustrating one form of the compressor shown in FIG. 1 utilizing a subsampling system.
Figure 4:
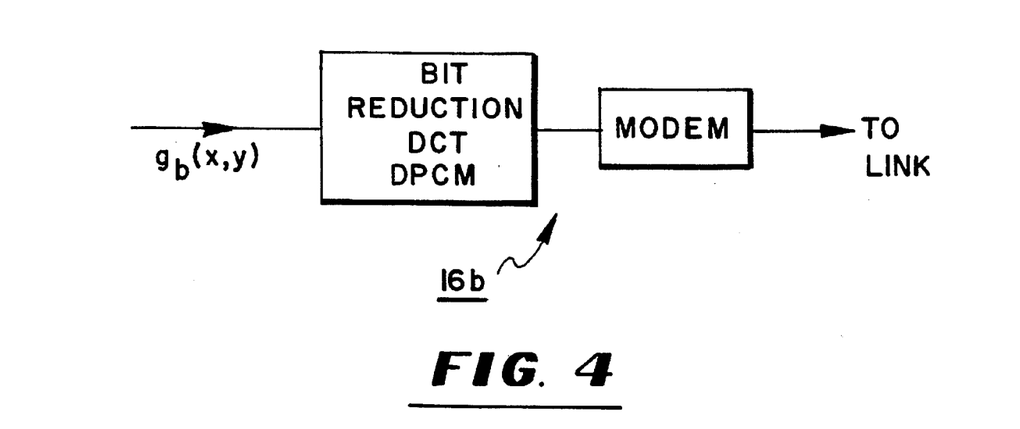
FIG. 4 is a block diagram illustrating one form of the compressor shown in FIG. 1 utilizing a bit reduction system.

The processes performed in the computer 12 and in the processor 22 are shown in FIGS. 2–4. The original sharp picture p(x,y) is convolved with the blurring function b(x,y) by a two-dimensional (2D) convolution to provide the blurred picture data $g_b(x,y)$. This blurred picture is stored in two dimensions in an n×n pixel array. In the subsampling system the sampler then transmits and/or stores compressed data by coarse scanning the number of pixels transmitted, n*×n*. The number of pixels in the product n*×n* may be, for example, ½ to ¹⁄₁₀₀th the number of pixels in the n×n array. It is this compressed data that is transmitted over the link and/or stored. This compressed data is received or read from storage. Then a 2D Fourier transform is performed on the compressed data resulting in Fourier transform space, $G_b(f_x, f_y)$. The Fourier transform of the blurring function $B(f_x, f_y)$ is obtained by another Fourier transform process. These Fourier transform processes may both be fast Fourier transforms (FFT).

The blurred picture transform $G_b(f_x, f_y)$ is divided by the blurring transform $B(f_x, f_y)$ and the quotient is applied to a Fourier inverter also operative in two dimensions. The result is the original sharp picture p(x,y) which may be displayed or printed. It can be shown that the zeros of $B(f_x,f_y)$ are isolated and thus there is a neglible likelihood that a zero can occur to disrupt the inversion process.

Figure 5:
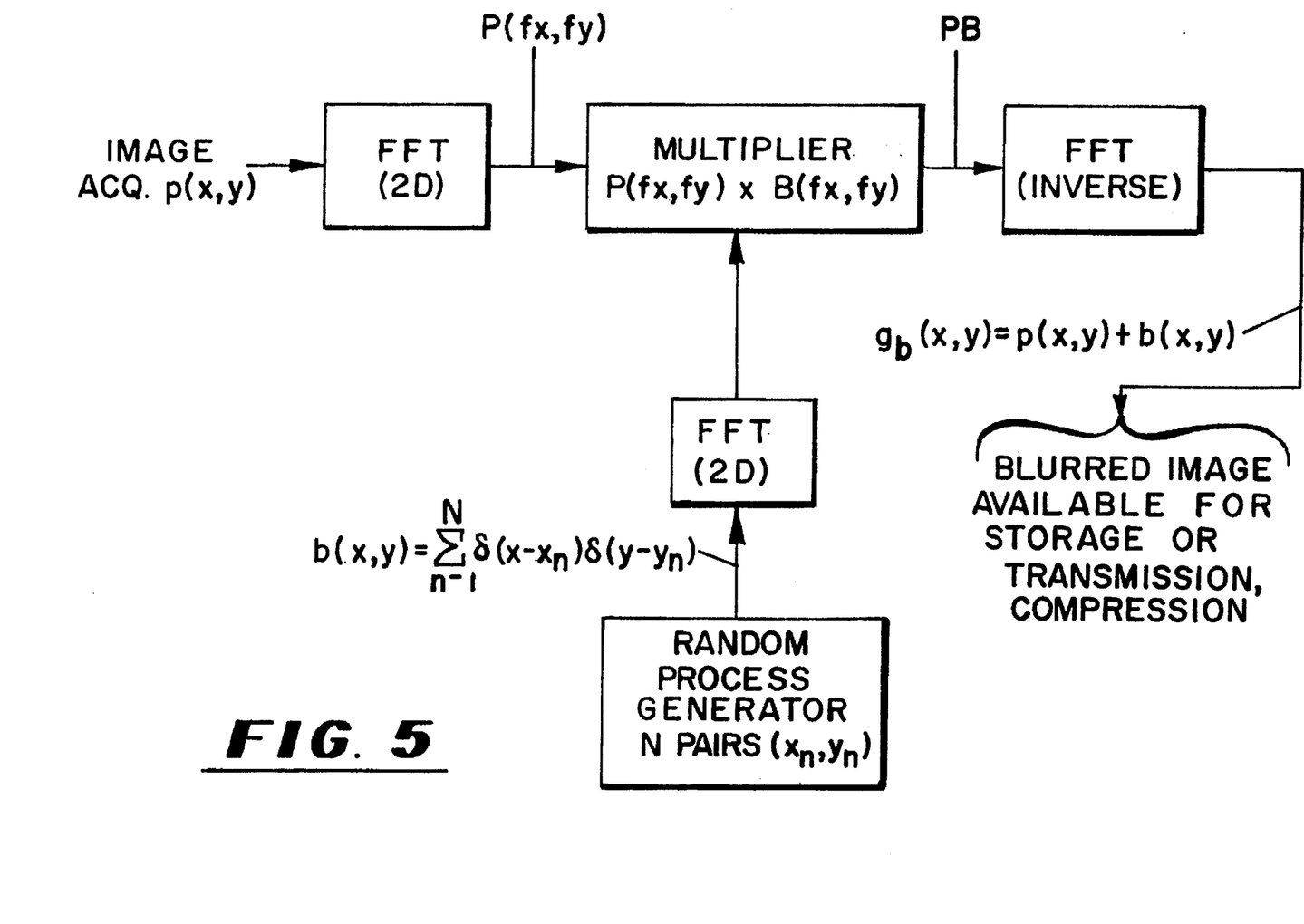
FIG. 5 is a flow chart illustrating the processes used in computing the blurred image which are carried out in the digital data processor of FIG. 1.

The convolution process utilizes a 2D-FFT to obtain the Fourier transform of the image, $P(f_x,f_y)$. Another 2D Fourier transform is used to provide the blurring function transform $B(f_x,f_y)$. The random process generator produces N pairs $x_n,y_n$ which can be mathematically represented by equation (5) which is illustrated in FIG. 5 at the input to the FFT process which produces an output $B(f_x,f_y)$.

A multiplier produces the product of $P(f_x,f_y)$ and $B(f_x,f_y)$. This product is subject to a two-dimensional inverse FFT to produce the blurred image $g_b(x,y)$ which is then sampled to provide compressed data for storage or transmission.

The following presentation shows that the blurred version of the original image requires significantly fewer pixels for transmission or storage then the original hence providing data compression ratios for example from 2 to 100. The restoration of the original image from the compressed data uses the blurring function in an inverse filtering process as discussed above.

Consider an image p(x,y) that has a frame size X by Y and a pixel size Δy=Δx. Based on the Whittaker-Shannon sampling theorem, (see, e.g., "Introduction to Fourier Optics", Joseph W. Goodman (McGraw-Hill Book Co., San Francisco, 1968) Section 2.3 p. 21 and problem 2.12 page 28.), the number of pixels required to characterize this picture is given by Np as $$N_p = \frac{XY}{\Delta x \Delta y} \quad (1)$$

In the frequency space using Nyquist sampling concepts, the image p(x,y) occupies in spatial-frequency (or Fourier transform) space denoted by A that is given by the following:

$$A = F_x F_y \quad (2)$$

in which $$F_x = \frac{1}{\Delta x} \quad (3)$$

$$F_y = \frac{1}{\Delta y}$$

The size of the Fourier transform space, in spatial frequency coordinates, is $F_x$ by $F_y$. Now, substitution of Eq. (3) into Eq. (1) yields the number of pixels expressed as the product of the area of the picture in (x,y) space and the area in spatial-frequency space, viz.

$$N_p = (XY)(F_x F_y) \quad (4)$$

From the foregoing discussion the space-bandwidth product of a compressed version of the original image after blurring may be derived. Consider the blurred image as defined by the point-spread function (psf) that consists of N randomly distributed points $(x_n,y_n)$. The original image is characterized in terms of its intensity by p(x,y) which is a real-valued function of real (x,y) and it is also non-negative.

The blur function b(x,y) is given by in which N is an integer typically from 2 to 250. For purposes of $$b(x,y) = \sum_{n=1}^{N} \delta(x - x_n)\delta(y - y_n) \quad (5)$$

this presentation N=25. The numbers $(x_n,y_n)$ are obtained from using the random-process-generator. Statistically $x_n$ and $y_n$ are chosen from distributions characterized by a probability density function, $f(x_n) f(y_n)$. The numbers $x_n$ and $y_n$ are taken as uncorrelated and both as having the same probability density function.

The blurred picture is denoted by $g_b(x,y)$ and is given by the expression $$g_b(x,y) = \int \int_{-\infty}^{\infty} p(x-x', y-y') b(x',y') dx' dy' \quad (6)$$

In Eq. (6) this integral form is often denoted by an asterisk, as in Eq. (7), which shows Eq. (6) as a two-dimensional convolution:

$$g_b(x,y) = p(x,y) * b(x,y) \quad (7)$$

The blurred image $g_b(x,y)$ contains sufficient information to enable recovery of the original image, p(x,y,),; very accurately. Moreover, the number of pixels required to characterize $g_b(x,y)$ is considerably less than that required to characterize p(x,y); thus providing significant data compression for storage or transmission of data representing the original image and from which it can be recovered accurately. This compression will be apparent from the reduction in the space-bandwidth product of $g_b(x,y)$ relative to p(x,y).

Consider the two-dimensional Fourier transforms of both sides of Eq. (7); the result is $$G_b(f_x,f_y)=P(f_x,f_y)B(f_x,f_y) \tag{8}$$

where capital letters denote the Fourier transforms of the corresponding functions. The blurring function $B(f_x,f_y)$ acts as a low-pass filter in the spatial-frequency domain. Consider the function $b(x,y)$; it has a Fourier transform $B(f_x,f_y)$ defined by the following integral:

$$B(f_x,f_y) = \int\int_{-\infty}^{\infty} dx dy b(x,y) e^{-i2\pi f_x x - i2\pi f_y y} \tag{9}$$

Substitution of Eq. (5) into Eq. (9) yields the following form for the transform of the blurring function:

$$B(f_x,f_y) = \sum_{n=1}^{N} e^{-i2\pi f_x x_n - i2\pi f_y y_n} \tag{10}$$

Using statistical analysis, we calculate the expected value of $B(f_x,f_y)$, denoted by the ensemble average bracket notation:

$$B<f_x,f_y>=NF(f_x)F(f_y) \tag{11}$$

In Eq. (11), the function $F(f_x)$ is the characteristic function (the Fourier transform) corresponding to the probability density $f(x_n)$. This notation is as follows:
The value of the spectral density is computed using Eq. (8). This appropriate form (where $(f_x,f_y)$ are omitted for simplification) is $$<e^{-i2\pi f_x x_n}> = \int_{-\infty}^{\infty} dx_n f(x_n) e^{-i2\pi f_x x_n} \tag{12}$$

$$<e^{-i2\pi f_x x_n}> = F(f_x)$$

simplification) is $$<G_b G_b^*>=PP^*<BB^*> \tag{13}$$

Again, the band-limiting property is seen by examination of the term $<BB^*>$. From Eq. (10) $<BB^*>$ can be expressed as:

$$<BB^*>=N+N(N-1)|F(f_x)|^2|F(f_y)|^2 \tag{14}$$

where $F(f_y)$ is the characteristic function of the probability density $f(y_n)$, derived similarly to $F(f_x)$ as shown in Eq. (12). Critical values of $<BB^*>$ using Eq. (14) are as follows:

$$<BB^*>=N^2, \text{ when } f_x=f_y=0 \tag{15}$$

$$<BB^*>=N, \text{ as } f_x,f_y\to\infty \tag{16}$$

In other words, in spatial frequency space, Eqs. (13) to (16) show the compression of the original data $PP^*$. The shape of the envelope $<BB^*>$ controls the distribution of energy in the blurred image and thus controls the amount of compression achievable. At large $f_x$ and $f_y$, the envelope function $<BB^*>$ is small and so there is little need for storing this data. Thus the band-limiting envelope (in frequency space) controls the compression. The number of points N determines the amount of high frequency reduction since high frequencies are reduced by a factor of 1/N relative to low frequencies.

Table 1 contains the bandlimiting envelope that controls the compression, $<BB^*>$, for two important practical choices of the random code: (1) Uniform density and (2) Gaussian density. Two different criteria are useful to describe the controlled blurring. These are tabulated in columns: (a) using bandwidth to the first null or to $1/e$ and (b) more conservative limit defined as $1/N^2$ of the second term of Eq. (14).

TABLE 1

| | Typical Blurring Estimates | | |
|---|---|---|---|
| Density Function | Compression Envelope | Compression Criteria | |
| for Random Code | $<BB^*>$ | (a) | (b) |
| 1) Uniform | $N + N(N + 1)\text{sinc}^2(sf_x)\text{sinc}^2(sf_y)$, $s = m\Delta x$ | $(m)^2$ | $(\pi m)^2/[N(N + 1)]$ |
| 2) Gaussian | $N + N(N + 1)e^{-(2\pi\sigma)2(f_x{}^2+f_y{}^2)}$, $\sigma = q\Delta x$ | $(2\pi q)^2$ | $(2\pi q)^2/\ln[N(N + 1)]$ |

A generalized controlled blurring function may also be used. This function is described by $$b_1(x,y) = s(x,y) * \sum_{n=1}^{N} \delta(x-x_n)\delta(y-y_n) \tag{17}$$

$$= \sum_{n=1}^{N} s(x-x_n, y-y_n) \tag{18}$$

where $s(x,y)$ is a sampling function such as the gaussian or a triangle function. This function provides greater smoothing and hence better compression and better reduction of perceived detail in the coded image. For illustration, $s(x,y)$ can be written as follows:

$$s(x,y) = e^{-\frac{x^2+y^2}{w^2}} \tag{19}$$

in which w is a constant which is arbitrarily chosen, but in a magnitude range suitable for computer operations.

Another blurring function can be generated by using an impulse response of the following form:

$$b_2(x,y)=C\delta(x)\delta(y)+b_1(x,y). \tag{20}$$

In frequency space the equivalent multiplicative transfer function is given by taking the two dimensional Fourier transform of $b_2(x,y)$; the result for $B_2(f_x,f_y)$ is given by $$B_2(f_x,f_y)=C+B_1(f_x,f_y) \tag{21}$$

Where only one exponential is employed i.e., $$b_2(x,y) = C\delta(x)\delta(y) + e^{-\frac{x^2+y^2}{w^2}} \quad (22)$$

The shape of the $b_2(x,y)$ function in frequency space is a flat pedestal capped by the exponential function for low spatial frequencies. The blurred image is very smooth and contains only small high frequency components. These high frequency components being about an order of magnitude lower than the low spatial frequency components. The compression of such blurred images is particularly efficient using Discrete Cosine Transform (DCT) or differential pulse code modulation (DPCM) methods.

From the foregoing description, it will be apparent that there has been provided an improved data compression system utilizing controlled blurring with a blurring function which is a random code thereby also providing security of transmission and/or storage. It will be appreciated that different blurring codes, which can be changed from time to time may be used depending upon the data compression ratio and degree of secrecy required. Variations and modifications in the herein-described system, within the scope of the invention, will undoubtedly suggest themselves to those skilled in the art. Accordingly, the foregoing description should be taken as illustrative and not in a limiting sense.

We claim:

1. A system for compressing and decompressing image data signals representing an original image characterized by $p(x,y)$, where x and y are the spatial coordinates of pixels of the image, which system comprises:

(a) means to convolve said image data signals with coded random pattern data signals generated according to a blurring function $$b(x,y) = \sum_{n=1}^{N} \delta(x-x_n)\delta(y-y_n)$$

where N is an integer greater than one and $x_n$ and $y_n$ are the positions of delta-function impulses, $x_n$ and $y_n$ being chosen from distributions characterized by probability density functions, to provide convolved data signals representing a blurred image;

(b) means to compress said convolved data signals to permit efficient storage or transmission of the information in said original image; and (c) means to recover said original image from said convolved compressed data signals with a function which is the inverse of said compressing means and said coded blurring means to provide data signals representing said original image in restored form.

2. The system according to claim 1 wherein said signal convolving means, said compressing means, and said recovering means are operative in object space, said convolving means providing the convolution, $g_b(x,y)=p(x,y)*b(x,y)$.

3. The system according to claim 1 wherein said signal convolving means, said compressing means, and said recovering means are operative in spatial frequency space.

4. The system according to claim 3 wherein (a) said signal convolving means and compressing means comprises means for providing the Fourier transform of the data signals representing $p(x,y)$ and $b(x,y)$ which in said spatial frequency space are $p(f_x,f_y)$ and $B(f_x,f_y)$, respectively; means for multiplying $P(f_x,f_y)$ and $B(f_x,f_y)$ to provide the product thereof, $G_b(f_x,f_y)$; and means for providing said compressed convolved data signals in response to and representing $G_b(f_x,f_y)$; and (b) said recovering means includes means for providing, in response to the compressed data signals representing $G_b(f_x,f_y)$ and data signals representing $B(f_x,f_y)$, data representing the quotient thereof, and means for providing the inverse Fourier transform of said quotient to provide said data signals representing said original image in restored form.

5. The system according to claim 1 further comprising means operative according to a random process for obtaining $x_n$ and $y_n$.

6. The system according to claim 5 wherein said random process operative means is a generator providing a generally random point spread function of N points in an area in x and y containing said image.

7. The system according to claim 6 wherein N is in a range from 2 to 250.

8. The system according to claim 1 wherein said means to compress said convolved data signals further comprises either means for subsampling said signals after convolving with the blurring function or means for reducing the number of bits representing pixels at each of said spatial coordinates x & y.

9. The system according to claim 8 wherein said data compressing means operative on pixels of said blurred image is selected from the group consisting of means for subsampling said pixels and means for reducing the number of bits of data signals representing said blurred pixels.

10. The system according to claim 1 wherein the blurring function is another blurring function which is described by $$b_1(x,y) = s(x,y) * \sum_{n=1}^{N} \delta(x-x_n)\delta(y-y_n)$$
$$= \sum_{n=1}^{N} s(x-x_n, y-y_n)$$

where $s(x,y)$ is a sampling function including Gaussian and triangle functions.

11. The system according to claim 10 wherein $s(x,y)$ is $$s(x,y) = e^{-\frac{x^2+y^2}{w^2}}$$

in which w is a constant.

12. The system according to claim 10 wherein one of the impulses is taken at the origin i.e. $\delta(x)\delta(y)$ and includes the point $(x_1=0, y_1=0)$.

13. The system according to claim 10 wherein an impulse function at the origin $C\delta(x)\delta(y)$ is added to the generalized controlled blurring function $b_1(x,y)$ to give $b_2(x,y)$ defined by:

$$b_2(x,y) = C\delta(x)\delta(y) + b_1(x,y).$$

14. The system according to claim 13 wherein the blurring function is:

$$b_2(x,y) = C\delta(x)\delta(y) + e^{-\frac{x^2+y^2}{w^2}}$$

15. The system according to claim 1 wherein an impulse at the origin $C\delta(x)\delta(y)$ is added to define the blurring function.

16. The system according to claim 1 further comprising means to store or to transmit said compressed convolved data signals.

17. A system for representing an original image having a resolution characterized by a first array of picture elements (pixels) with a second array of pixels less in number than the pixels in said first array and from which said second array a restored version of said original image can be reproduced with approximately the same detail as said original image, said system comprising means for spatially coding said original image according to a spatial code to provide a blurred image, and means for spatially decoding said blurred image responsive to said spatial code to provide said restored version of said original image.

18. The system according to claim 17 further comprising means for translating said blurred image into said second array, and said spatial decoding means including means responsive to said spatial code which codes said image for translating said second array into an array of pixels generally corresponding to said first array.

19. The system according to claim 18 wherein said spatial code is a generally random point spread function of N points where N is an integer greater than one.

20. The system according to claim 19 wherein N is in a range from 2 to 250.

21. The system according to claim 18 wherein said translating means comprises means for scanning said blurred image to provide a pattern of pixels forming said second array.

22. The system according to claim 18 wherein said translating means comprises means for sampling said blurred image to provide data signals representing said second array.

23. The system according to claim 17 wherein said spatial coding means includes means operative upon the Fourier transform of said original image in accordance with a selected speckle pattern to provide said blurred image, said spatial decoding means includes means operative on said blurred image in accordance with said selected speckle pattern.

24. The system according to claim 23 wherein said speckle pattern is represented by the Fourier transform of a plurality of randomly distributed points, N in number where N is an integer greater than one.

25. The system according to claim 9 further comprising means to store or to transmit said second array of pixels.

26. A method for representing an original image having a resolution characterized by a first array of picture elements (pixels) with a second array of pixels less in number than the pixels in said first array and from which said second array a restored version of said original image can be reproduced with approximately the same detail as said original image comprising the steps of:

spatially coding said original image according to a spatial code to provide a blurred image, and spatially decoding said blurred image in response to said spatial code to provide said restored version of said original image.

27. A method according to claim 26 further comprising translating said blurred image into said second array, and where said spatially decoding step includes translating said second array into an array of pixels generally corresponding to said first array.

28. A method according to claim 26 wherein said spatial code is a generally random point spread function of N points where N is an integer greater than one.

29. A method according to claim 26 wherein said step of spatially coding according to said spatial code includes operating upon the Fourier transform of said original image in accordance with a selected speckle pattern to provide said blurred image, and said step of spatially decoding in response to said spatial code includes operating on said blurred image in accordance with said selected speckle pattern.

30. A method according to claim 26 whereby said spatial code is a blurring function represented by $$b(x,y) = \sum_{n=1}^{N} \delta(x - x_n)\delta(y - y_n)$$

where x and y are spatial coordinates of pixels, N is an integer greater than one and $x_n$ and $y_n$ are the positions of delta-function impulses, $x_n$ and $y_n$ being chosen from distributions characterised by probablity density functions, to provide convolved data signals representing a blurred image.

31. A method according to claim 30 wherein said blurring function is described by $$b_1(x,y) = s(x,y) * \sum_{n=1}^{N} \delta(x - x_n)\delta(y - y_n)$$
$$= \sum_{n=1}^{N} s(x - x_n, y - y_n)$$

where s(x,y) is a sampling function including Gaussian and triangle functions.

* * * * *